United States Patent [19]
Park

[11] Patent Number: 5,929,949
[45] Date of Patent: Jul. 27, 1999

[54] LIQUID CRYSTAL DISPLAYS INCLUDING LIGHT SHADING FILMS THAT ARE ELECTRICALLY CONNECTED TO PIXEL ELECTRODES, AND METHODS OF MANUFACTURING THE SAME

[75] Inventor: Woon-Yong Park, Kyungki-do, Rep. of Korea

[73] Assignee: Samsung Electronics Co., Ltd., Suwon, Rep. of Korea

[21] Appl. No.: 09/092,347

[22] Filed: Jun. 5, 1998

[30] Foreign Application Priority Data

Aug. 25, 1997 [KR] Rep. of Korea ................. 97-40655

[51] Int. Cl.⁶ ................. G02F 1/136; G02F 1/1343; G02F 1/1333
[52] U.S. Cl. ................. 349/44; 349/111; 349/38
[58] Field of Search ................. 349/44, 38, 39, 349/111, 110

[56] References Cited

U.S. PATENT DOCUMENTS

| | | | |
|---|---|---|---|
| 5,414,547 | 5/1995 | Matsuo et al. | 349/44 |
| 5,517,341 | 5/1996 | Kim et al. | 359/59 |
| 5,561,440 | 10/1996 | Kitajima et al. | 345/87 |
| 5,686,977 | 11/1997 | Kim et al. | 349/38 |
| 5,696,566 | 12/1997 | Kim et al. | 349/39 |

*Primary Examiner*—William L. Sikes
*Assistant Examiner*—Heidi L. Eisenhut
*Attorney, Agent, or Firm*—Myers Bigel Sibley & Sajovec

[57] ABSTRACT

A conductive light shading film of a liquid crystal display is electrically connected to a pixel electrode. By connecting the light shading film to the pixel electrode, the light shading film will have the same voltage as the pixel electrode, and can thereby reduce parasitic capacitance and voltage variations on the pixels. The light shading film preferably includes a plurality of conductive light shading lines. The conductive light shading lines can be formed from the same patterned conductive layer as the gate lines or the data lines. Contact holes in insulating layers are used to electrically contact the conductive light shading lines to the pixel electrodes.

26 Claims, 11 Drawing Sheets

LIQUID CRYSTAL DISPLAYS INCLUDING LIGHT SHADING FILMS THAT ARE ELECTRICALLY CONNECTED TO PIXEL ELECTRODES, AND METHODS OF MANUFACTURING THE SAME

FIELD OF THE INVENTION

This invention relates to liquid crystal displays and manufacturing methods therefor, and more particularly to liquid crystal displays including light shading films and methods of manufacturing the same.

BACKGROUND OF THE INVENTION

Liquid crystal displays (LCDs) are widely used flat panel display devices. As is well known to those having skill in the art, a liquid crystal display generally includes a pair of spaced apart substrates with liquid crystals therebetween. Arrays of spaced apart data lines and gate lines define an array of pixels. A thin film transistor (TFT) for each pixel is electrically connected to a data line, a gate line and a pixel electrode.

It is known to provide auxiliary gate lines that extend orthogonally between adjacent spaced apart gate lines. A pair of auxiliary gate lines may be provided in each pixel, at opposite ends thereof, so that two gate lines and the two auxiliary gate lines therebetween form a gate ring around the periphery of the pixel. See for example U.S. Pat. Nos. 5,696,566 to Kim et al., 5,686,977 to Kim et al. and 5,517,341 to Kim et al, that are assigned to the Assignee of the present invention.

In the above-described gate ring structure, the gate ring can act as a shading film that prevents light from leaking at the pixel boundary. The gate ring can also function as a storage capacitor since it can be overlapped with the pixel electrode. Unfortunately, however, the storage capacitance of this storage capacitor may be higher than desired and may be difficult to control.

Another liquid crystal display with a ring pixel structure is described in U.S. Pat. No. 5,561,440 to Kitajima et al. entitled "Liquid Crystal Display Device and Driving Method Therefor". In this patent, each pixel can include one or two auxiliary lines that are electrically disconnected (floating) from the gate line, in order to reduce storage capacitance. The auxiliary lines act as a light shading film. Unfortunately, the floating auxiliary lines may generate parasitic capacitance with the pixel electrode and/or the data line. This parasitic capacitance may add to the existing parasitic capacitance in the liquid crystal display. Thus, the total amount of parasitic capacitance between the pixel electrode and the data line may be as follows:

$$C_{sd} = \frac{C_{sf} \cdot C_{df}}{C_{sf} \cdot C_{df}} + C_{ds}, \text{ where}$$

$C_{sd}$ is the total parasitic capacitance between the pixel electrode and the data line;

$C_{sf}$ is parasitic capacitance between the pixel electrode and the floating region;

$C_{df}$ is parasitic capacitance between the data line and the floating region; and $C_{ds}$ is parasitic capacitance between the data line and the pixel electrode.

Unfortunately, the added parasitic capacitance may degrade the quality of the displays produced by the liquid crystal display, especially at the boundary of a block of pixels. Moreover, the floating pixel electrode can adversely affect the data voltages that are applied to the pixel, which can also degrade the display quality.

SUMMARY OF THE INVENTION

It is therefore an object of the present invention to provide improved liquid crystal displays including light shading films and methods of manufacturing the same.

It is another object of the present invention to provide liquid crystal displays including light shading films that need not unduly increase parasitic capacitance.

It is still another object of the present invention to provide liquid crystal displays including conductive light shading films that need not degrade the display qualities of the liquid crystal display.

These and other objects are provided according to the present invention, by electrically connecting the conductive light shading film of a liquid crystal display to a pixel electrode. By connecting the light shading film to the pixel electrode, the light shading film will have the same voltage as the pixel electrode, and can thereby reduce parasitic capacitance and voltage variations on the pixels.

More specifically, liquid crystal displays according to the present invention include a liquid crystal display substrate, an array of spaced apart gate lines on the substrate, and an array of spaced apart data lines on the substrate that intersect the array of spaced apart gate lines to define an array of pixels therebetween. An array of pixel electrodes is also provided, a respective one of which is in a respective pixel. An array of switching elements such as thin film transistors is also provided, a respective one of which is connected between one of the gate lines, one of the data lines and a pixel electrode. An array of conductive light shading films is also provided, a respective one of which is in a respective pixel, spaced apart from the array of gate lines and from the array of data lines. A respective conductive light shading film is electrically connected to the respective pixel electrode.

The light shading film preferably includes a plurality of conductive light shading lines. One conductive light shading line can be provided for each pixel, which extends parallel to the data lines or the gate lines. First and second conductive light shading lines may also be provided for each pixel that extend parallel to the data lines or parallel to the gate lines, on opposite sides of the respective pixel electrode. Moreover, light shading lines may be used in conjunction with an array of spaced apart auxiliary gate lines that intersect and are electrically connected to the array of spaced apart gate lines. In one embodiment, one auxiliary gate line and one light shading line extend parallel to the data lines on opposite sides of a respective pixel electrode. In another embodiment, two auxiliary gate lines may be provided and first and second light shading lines may be provided that extend orthogonal to the auxiliary gate lines on opposite sides of a respective pixel electrode. Other combinations of auxiliary gate lines and conductive light shading lines that are electrically connected to a respective pixel electrode may also be provided.

The conductive light shading lines may be formed from the same patterned conductive layer as the gate lines or the data lines. Thus, the liquid crystal display may comprise first and second conductive layers, wherein the data lines comprise a first portion of the first conductive layer, wherein the array of gate lines comprise a first portion of the second conductive layer and wherein the array of first conductive light shading lines comprise a second portion of the first or second conductive layer. When first and second conductive light shading lines are provided for each pixel, they may also be formed from the first conductive layer or the second conductive layer.

In all of these embodiments, a respective conductive light shading film preferably overlaps a respective pixel electrode. Moreover, the conductive light shading film is preferably an opaque metal film that overlaps an end of a respective pixel electrode, to thereby block light that emerges from the respective ends of the pixel electrodes. The light shading film is preferably connected to the pixel electrode via contact holes that extend between one or more insulating layers that are provided between the pixel electrode and the light shading film. More specifically, an insulating layer may be provided between the array of pixel electrodes and the array of conductive light shading films. An array of contact holes may be provided in the insulating layer, a respective one of which extends between a respective pixel electrode and a respective conductive light shading film. A respective pixel electrode and a respective conductive light shading film electrically contact one another through the respective contact hole.

In another embodiment, first and second insulating layers are provided between the array of pixel electrodes and the array of conductive light shading films. Then, first and second arrays of contact holes are provided in the respective first and second insulating layers. A respective one of the first contact holes overlap a respective one of the second contact holes, to form an array of multiple layer contact holes, a respective one of which extends between a respective pixel electrode and a respective conductive light shading film. A respective pixel electrode and a respective conductive light shading film electrically contact one another through the respective multiple layer contact hole.

In one specific embodiment of the present invention, a liquid crystal display includes a liquid crystal display substrate, a gate line on the substrate and a first conductive light shading line on the substrate, spaced apart from the gate line. A first insulating film is provided on the gate line and on the first conductive light shading line. The first insulating film includes a first contact hole that exposes the first conductive light shading line. A first data line is provided on the first insulating film. A second insulating film is provided on the first data line. The second insulating film includes a second contact hole that exposes the first contact hole. A pixel electrode is provided on the second insulating film, that receives signals from the first data line and that is electrically connected to the first conductive light shading line through the first and second contact holes. A second conductive light shading line may be provided as well. The first and second light shading lines and the data line are portions of a single conductive layer.

In another embodiment, the conductive light shading lines are formed as part of the same layer as the data lines. In this embodiment, a liquid crystal display includes a gate line on a liquid crystal display substrate, a first insulating film on the gate line and a first data line on the first insulating film, extending perpendicular to the gate line. A first conductive light shading line is also provided on the first insulating film, spaced apart from and extending parallel to the first data line. A second insulating film is provided on the first data line. The second insulating film includes a first contact hole that exposes the first conductive light shading line. A pixel electrode is included on the second insulating film that receives signals from the first data line and that is electrically connected to the first conductive light shading line through the first contact hole. A second conductive line may also be provided on the first insulating film that is electrically connected to the pixel electrode through a second contact hole.

Methods of fabricating liquid crystal displays according to the present invention fabricate conductive light shading lines as part of a gate line pattern or a data line pattern, and connect the conductive light shading lines to the pixel electrodes via contact holes in insulating layers. In a first embodiment, a first patterned conductive layer is formed on a liquid crystal display substrate, the first patterned conductive layer defining a gate line and a first conductive light shading line that is spaced apart from the gate line. A first insulating film is formed on the first patterned conductive layer, the first insulating film including a first contact hole that exposes the first conductive light shading line. A semiconductor layer is formed on the first insulating film. A second patterned conductive layer is formed on the first insulating film and on the semiconductor layer, the second patterned conductive layer defining a data line on the first insulating film, a source electrode on the semiconductor layer that is connected to the data line, and a drain electrode on the semiconductor layer. A second insulating film is formed on the second patterned conductive layer, the second insulating film including a second contact hole that exposes the first contact hole, and a third contact hole that exposes the drain electrode. A pixel electrode is formed on the second insulating film, that is electrically connected to the first conductive light shading line through the first and second contact holes, and to the drain electrode through the third contact hole.

First and second conductive light shading lines may also be included in the first patterned conductive layer. A fourth contact hole may then be formed in the first insulating film that exposes the second conductive light shading line. A fifth contact hole may be formed in the second insulating film that exposes the fourth contact hole. The pixel electrode is then connected to the second conductive light shading line through the fourth and fifth contact holes.

In another embodiment, the conductive light shading lines are formed as part of a second patterned conductive layer that includes the data lines. More specifically, a first patterned conductive layer is formed on a liquid crystal display substrate. the first patterned conductive layer defining a gate line. A first insulating film is formed on the first patterned conductive layer and a semiconductor layer is formed on the first insulating film. A second patterned conductive layer is formed on the first insulating film and on the semiconductor layer, the second patterned conductive layer defining a data line on the first insulating film, a first conductive light shading line on the first insulating film, a source electrode on the semiconductor layer that is connected to the data line and a drain electrode on the semiconductor layer. A second insulating film is formed on the second patterned conductive layer, the second insulating film including a first contact hole that exposes the first conductive light shading line and second contact hole that exposes the drain electrode. A pixel electrode is formed on the second insulating film, that is electrically connected to the first conductive light shading line through the first contact hole to the drain electrode through the second contact hole.

The second patterned conductive layer may also define first and second spaced apart conductive light shading lines on the first insulating film. In this case, the second insulating film also includes a third contact hole that exposes the second conductive light shading line. The pixel electrode is then connected to the second conductive light shading line through the third contact hole. Accordingly, improved performance of liquid crystal panels may be provided by electrically connecting light shading lines to pixel electrodes.

DETAILED DESCRIPTION OF PREFERRED EMBODIMENTS

Figure 1:
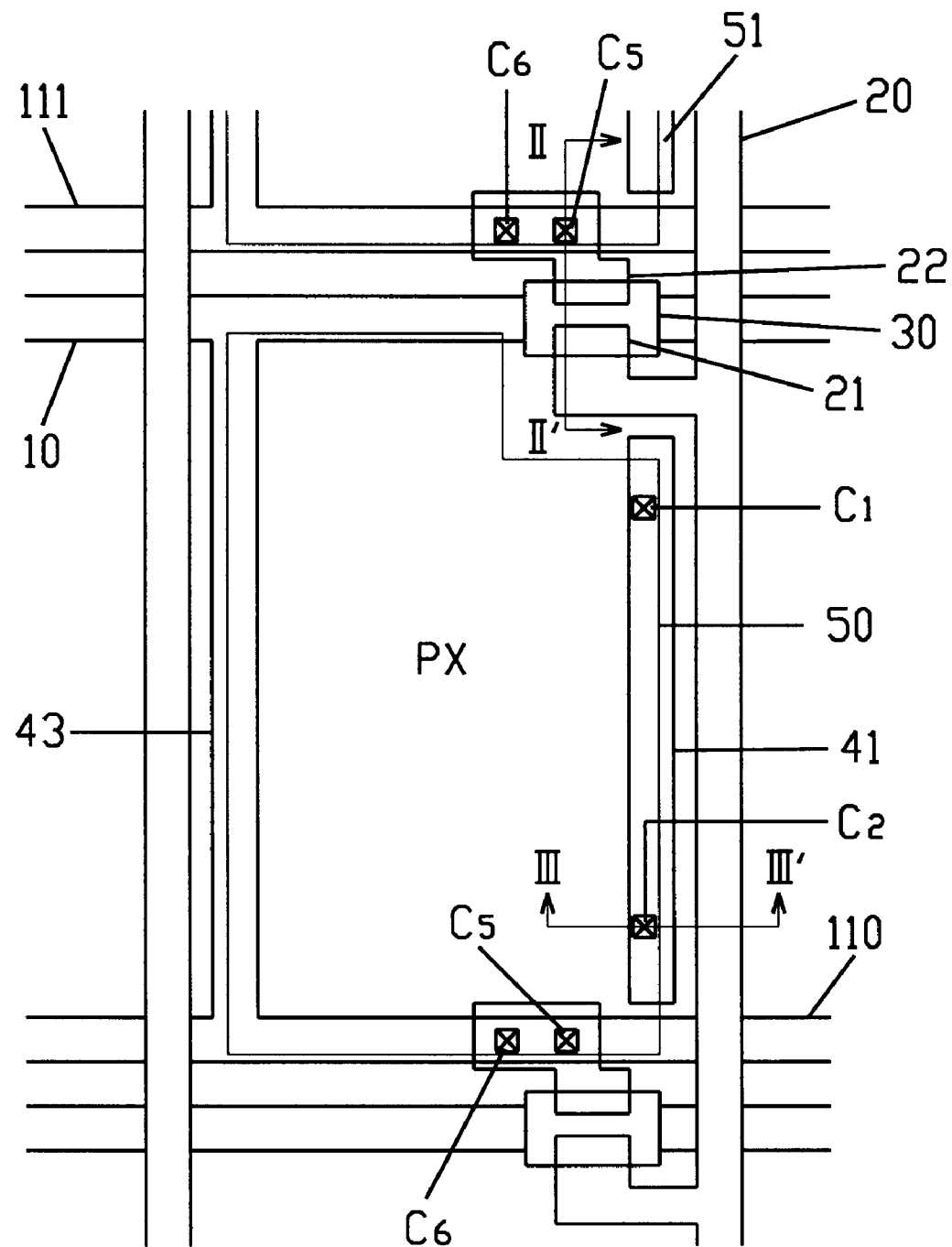
FIG. 1 is a wiring diagram of liquid crystal displays according to a first embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

It will be understood that when an element such as a layer, region or substrate is referred to as being "on" another element, it can be directly on the other element or intervening elements may also be present. In contrast, when an element is referred to as being "directly on" another element, there are no intervening elements present. It will also be understood that although the drawings only show one central pixel and portions of neighboring pixels, a conventional liquid crystal display includes an array of many pixels. It will also be understood that the terms horizontal and vertical are used herein to indicate mutually orthogonal directions, rather than a specific fixed orientation.

Figure 2:
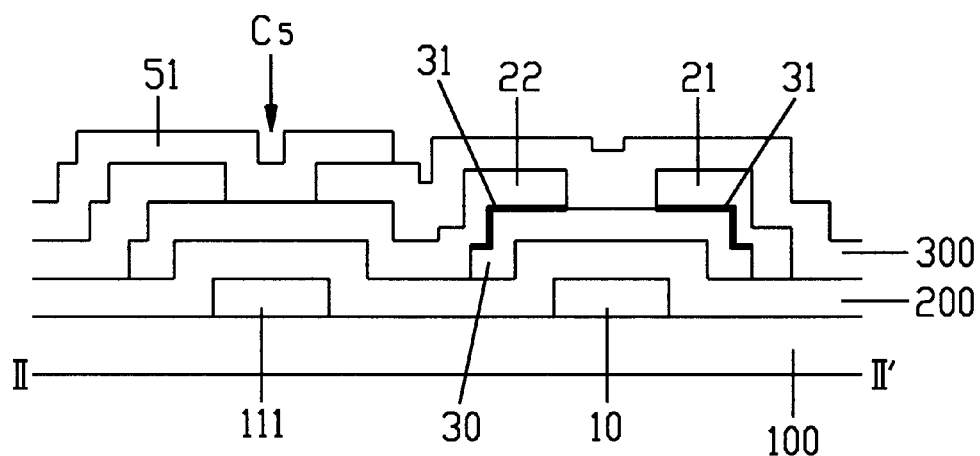
FIG. 2 shows a cross-sectional view along the line II–II'.
Figure 3:
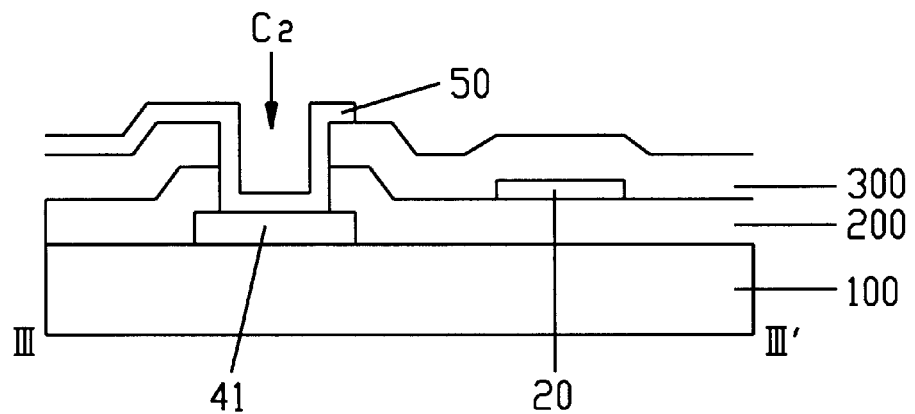
FIG. 3 shows a cross-sectional view along the line III–III'.
Figure 4:
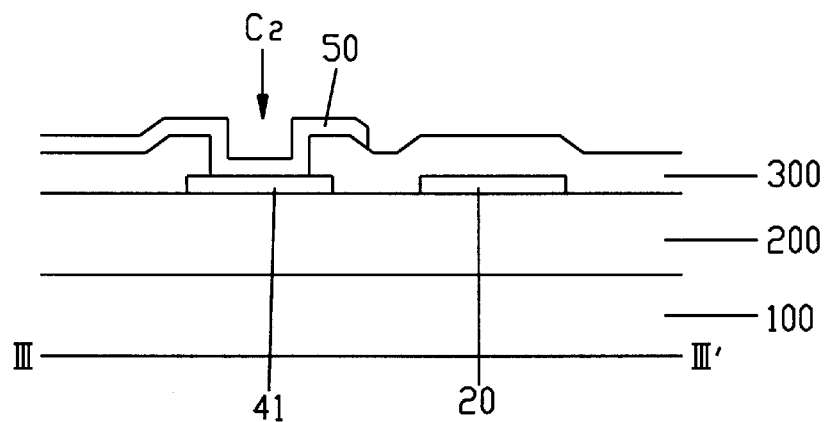
FIG. 4 shows another cross-sectional view along the line III–III'.

FIG. 1 is a wiring diagram showing double-gate type liquid crystal displays according to a first embodiment of the present invention. FIG. 2 shows a cross-sectional view along the line II–II', that is, a cross-sectional view about the periphery of a thin film transistor. FIG. 3 shows a cross-sectional view along the line III–III'. FIG. 4 shows another cross-sectional view along the line III–III'.

FIG. 1 shows a structure of a light-shading film in a double-gate type structure. A first gate line 10, transmitting a scanning signal, extends horizontally on a transparent insulating substrate 100. A second gate line 110 thereon extends parallel to the first gate line. An auxiliary gate line 43 vertically extends from the first gate line 10 to the second gate line 110 to prevent light from leaking and to form a storage capacitance. Also, a light-shading film 41 extends parallel to the auxiliary line 43 in the same layer as the gate lines 10 and 110 or the auxiliary line 43. Ends of the light-shading film 41 extend near the first or second gate lines 10 and 110. A gate insulating film, also referred to herein as a "first insulating film", covers these lines. An amorphous silicon layer 30 and an $n^+$ amorphous silicon layer 31 are provided on portions of the gate insulating film 200 on the first gate line 10. The gate line 10 below the amorphous silicon layer 30 serves as a gate electrode.

A data line 20 that transmits an image signal outside the light-shading film 41 extends vertically, and a portion extending from the data line 20 overlaps with one side of the amorphous silicon layer 30, thereby serving as a source electrode 21. A drain electrode 22 that is paced apart from the source electrode 21 is provided on the amorphous silicon layer 30. As is known to those of skill in the art, the $n^+$ amorphous silicon layer may be provided between the amorphous silicon layer 30 and the source and/or drain electrodes 21 and 22 to improve the ohmic contact therebetween. The drain electrode 22 extends to the gate line 111.

A guard film 300, also referred to herein as a "second insulating film", is provided on the data lines. Contact holes C1 and C2 are formed in the guard film 300 or the gate insulating film 200 to expose the light-shading film 41. Contact holes C5 and C6 are also formed to expose the drain electrode 22.

A pixel electrode, preferably an indium-tin-oxide (ITO) transparent pixel electrode 50, is provided on the guard film 300 in a pixel electrode region PX which is defined by the first or second gate lines 10 and 110 and the data line 20. The pixel electrode also partly or fully overlaps the sides of the gate lines 10 and 110, the auxiliary line 43 and/or one side of the light-shading film 41. The pixel electrode 50 is electrically connected to the drain electrode 22 through the contact holes C5 and C6, and to the light-shading film 41 through the contact holes C1 and C2. As described above, when the auxiliary line 43 and the light-shading film 41 are formed at opposite sides of the pixel electrode 50, light leaking out of the edge of the pixel electrode 50 is shaded by the auxiliary line 43 and the light-shading film 41.

A thin film transistor comprising the gate electrode 11, the source electrode 21, the drain electrode 22 and the amorphous silicon layer 30, switches an image signal from the data line 20 according to a scanning signal. The image signal is transmitted to the pixel electrode 50.

As shown in FIG. 4, the light-shading film 41 can be formed as part of the same layer as the data line 20. In this case, the contact holes C1 and C2 need not be formed in the gate insulating film 200.

Also, the auxiliary gate line 43 can be spaced apart from the first or second gate lines 10 and 110 in the same manner as the light-shading film 41. When formed as part of the same layer as the gate line 10, the auxiliary line 43 is connected to the pixel electrode 50 through a contact hole which is formed in the gate insulating film 200 on the gate line 10. When formed as part of the same layer as the data line 20, the auxiliary line 43 is connected to the pixel electrode 50 through a contact hole which is formed in the guard film 300.

Figure 6:
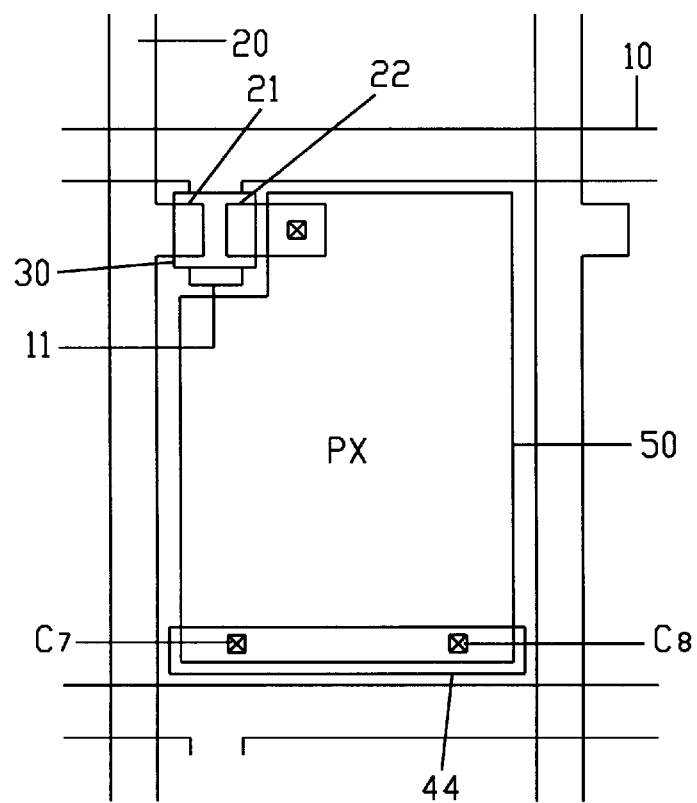
FIG. 6 is a wiring diagram of liquid crystal displays according to a third embodiment of the present invention.
Figure 5:
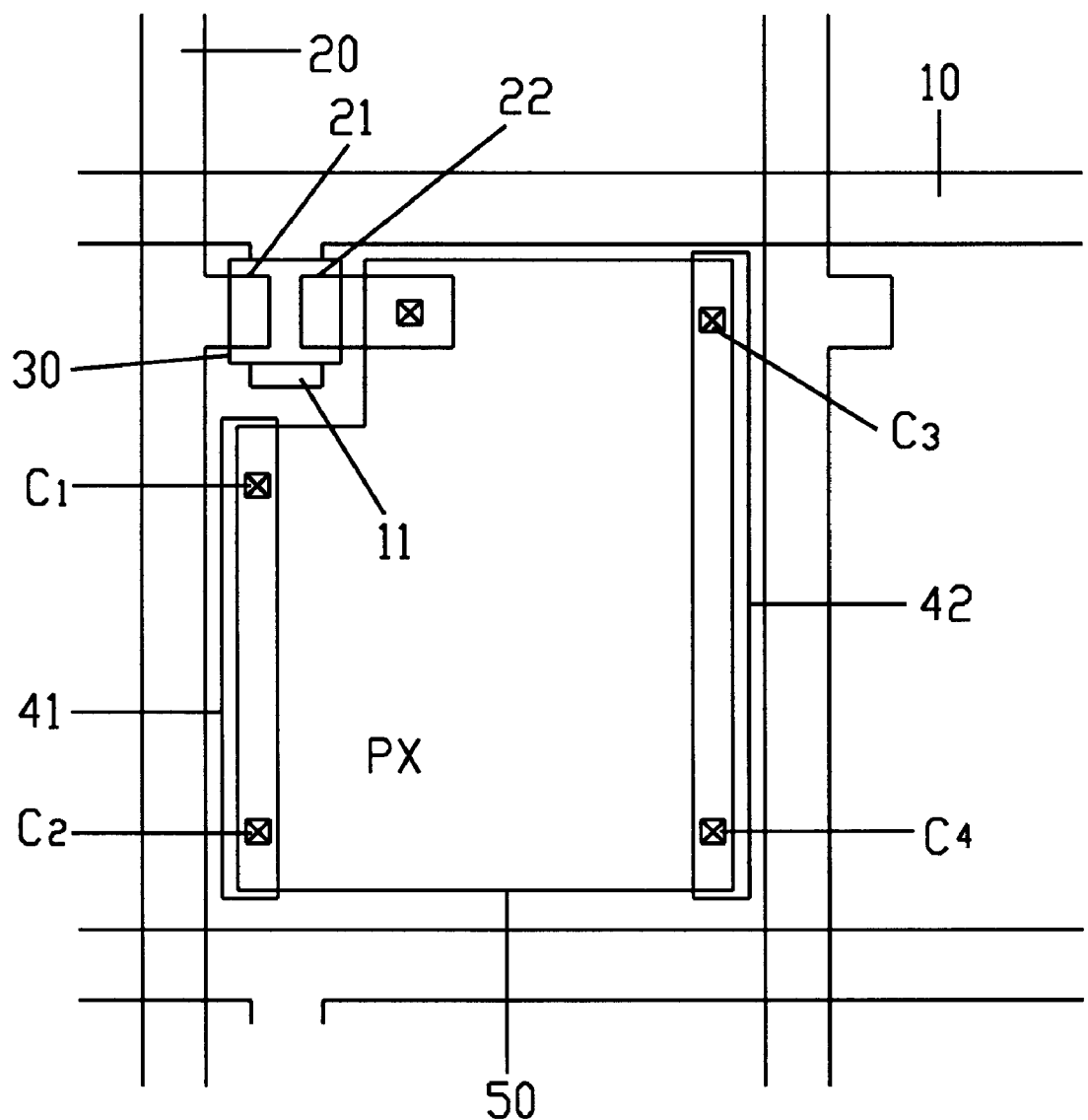
FIG. 5 is a wiring diagram of liquid crystal displays according to a second embodiment of the present invention.

FIGS. 5 and 6 are wiring diagrams of liquid crystal displays according to respective second and third embodiments of the present invention. These Figures. represent an example of liquid crystal displays having a single gate line.

As shown in FIG. 5, the gate line 10 that transmits a scanning signal is horizontally formed on a transparent insulating substrate. The data line 20 vertically crosses the gate line 10. The data line 20 and the gate line 10 cross each other, to thereby form a pixel region, and the pixel electrode 50 is formed in the pixel region. As described above, each pixel region PX has one thin film transistor having a source electrode 21, a drain electrode 22 and a gate electrode 11.

In order to prevent light from leaking through the edge of the pixel electrode 50, first and/or second light-shading films are vertically formed adjacent the edge of the pixel electrode 50. The light-shading films 41 and 42 are made of a conductive material and preferably overlap with the pixel electrode 50, between the guard film or the gate insulating film. The light-shading films 41 and 42 are connected to the pixel electrode 50 through the contact holes C1 and C2, C3 and C4 which are included in the guard film or the gate insulating film. The first or second light-shading films 41 and 42 may be formed as part of the same layer as the data line 20 or the gate line 10.

The first or second light-shading films 41 and 42 are connected to the pixel electrode 50 and therefore have the same electrical potential as the pixel electrode. Accordingly, when a data signal is applied to the pixel electrode 50, parasitic capacitance is preferably not generated between the light-shading films 41 and 42 and the pixel electrode 50.

FIG. 6 illustrates a light-shading film 44 formed parallel to the gate line 10. Here, the light-shading film 44 overlaps the pixel electrode 50, between the guard film or the gate insulating film. Also, the light-shading film 44 is connected to the pixel electrode 50 through the contact holes C7 and C8 which are included in the guard film or the gate insulating film.

The auxiliary line 43 or the light-shading films 41, 42 and 44, is preferably partly or fully overlapped with an edge of the pixel electrode 50. As described above, the light-shading films 41, 42 and 44, are connected to the pixel electrode 50 through the contact holes C1, C2 and C3, C4 and C7, C8 respectively and thereby have the same potential as the pixel electrode 50. Accordingly, parasitic capacitance is preferably not generated between the pixel electrode 50 and the light-shading films 41, 42 and 44.

Methods for manufacturing liquid crystal display devices shown in FIGS. 1 and 3 will now be explained with reference to FIGS. 7a through 11b. FIGS. 7a, 8a, 9a, 10a and 11a and FIGS. 7b, 8b, 9b, 10b and 11b, 7c, 8c, 9c, 10c, and 11c, are cross-sectional views along the lines II–II', III–III' respectively and are shown according to a manufacturing sequence of the present invention. FIGS. 12a, 12b, 12c, 12d and 12e are other cross-sectional views along the line III–III'.

Figure 7A:
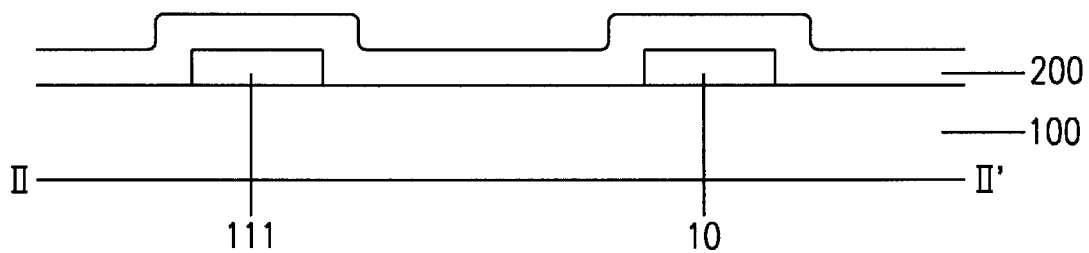
FIGS. 7a, 8a, 9a, 10a and 11a show cross-sectional views along the line II–II'according to manufacturing methods of the present invention.
Figure 7B:
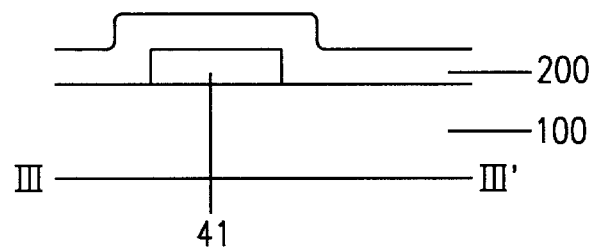
FIGS. 7b, 8b, 9b, 10b and 11b show cross-sectional views along the line III–III' according to manufacturing methods of the present invention.
Figure 7C:
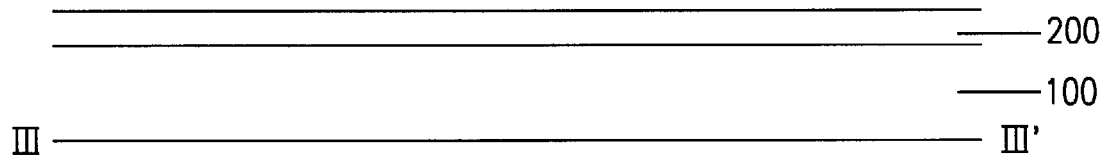

As shown in FIGS. 7a and 7c, a metal layer is formed on the transparent insulating layer 100. The metal layer is patterned to form the gate lines 10, 110 and 111, the auxiliary line 43 and the light-shading film 41. The gate insulating film 200 is then deposited thereon.

Figure 8A:
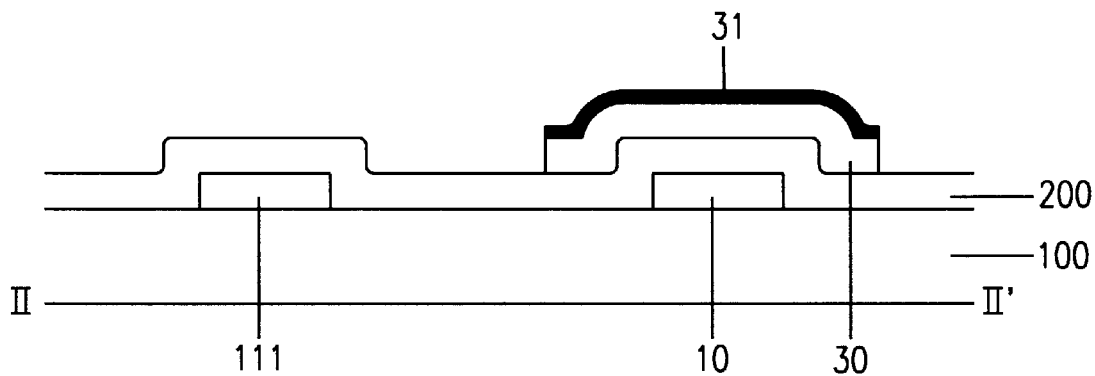
Figure 8B:
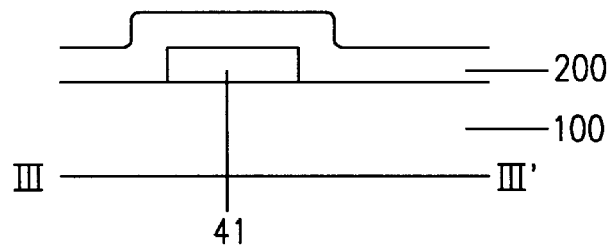
Figure 8C:
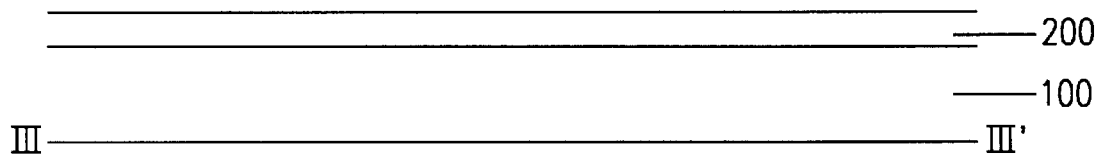

As shown in FIGS. 8a and 8c, an amorphous silicon layer and a doped amorphous silicon layer are sequentially deposited. Patterning is then performed so that amorphous silicon layer 30 and the doped amorphous silicon layer 31 are defined on the gate lines 10.

Figure 9A:
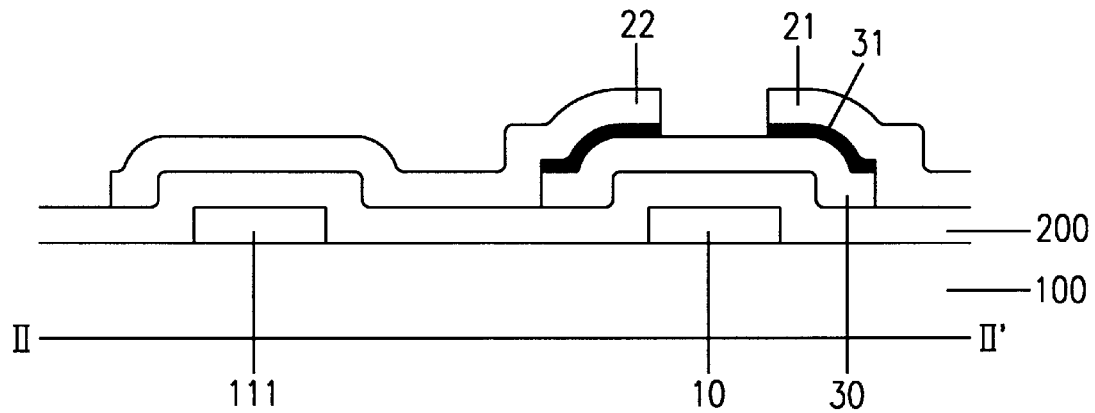
Figure 9B:
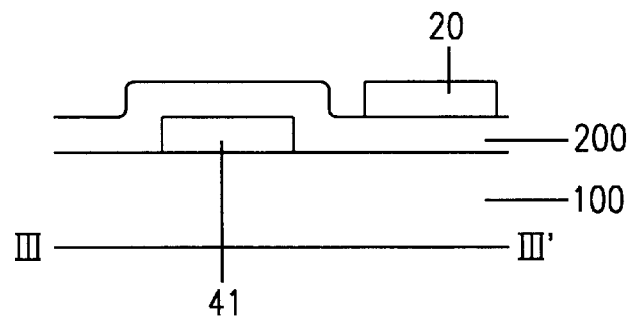
Figure 9C:
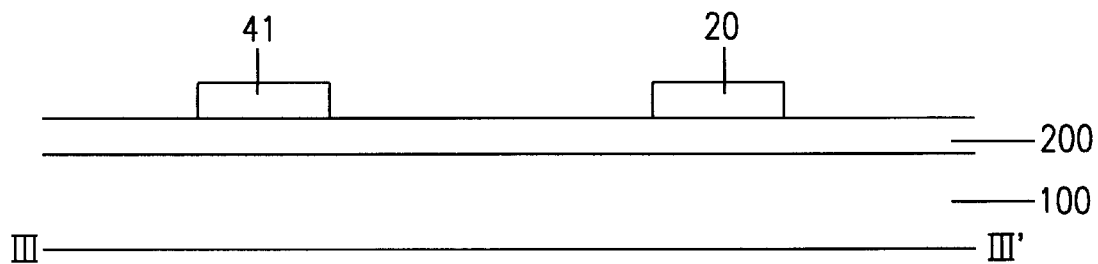

Next, as shown in FIGS. 9a and 9c, a metal layer is evaporated and patterned, to thereby form a data pattern including the source electrode 21, the drain electrode 22 and the data line 20. By using the data pattern as a mask and removing a portion of the doped amorphous silicon layer 31, the doped amorphous silicon layer 31 remains only at the portions contacting the source and drain electrodes 21 and 22.

Figure 10A:
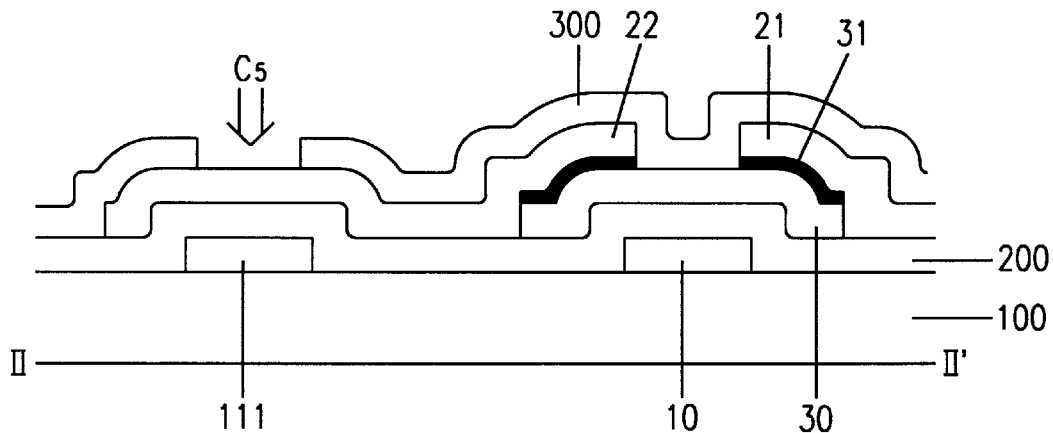
Figure 10B:
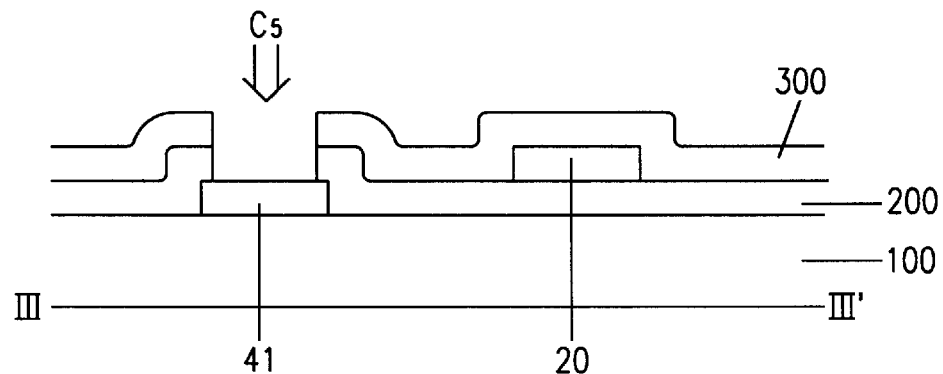
Figure 10C:
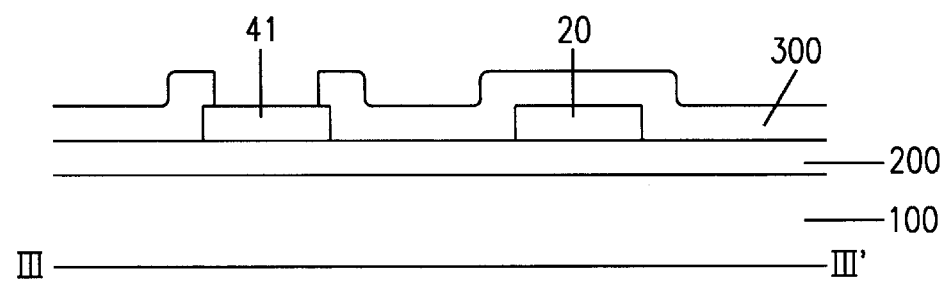

As shown in FIG. 10a and 10c, after depositing a guard film 300, the guard film 300 and the gate insulating film 200 are removed on the light-shading film 41 and the gate line 111. The contact holes C5 and C6 are formed to expose the drain electrode 22, and the contact holes C1 and C2 expose the light-shading film 41.

Figure 11A:
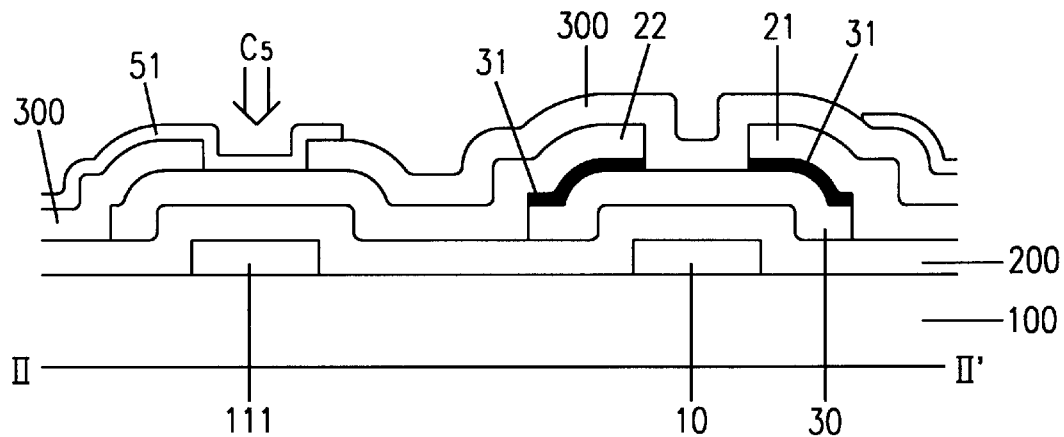
Figure 11B:
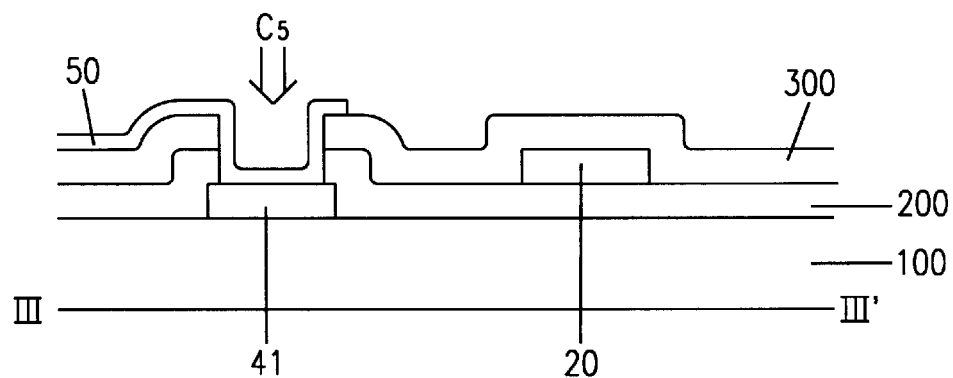
Figure 11C:
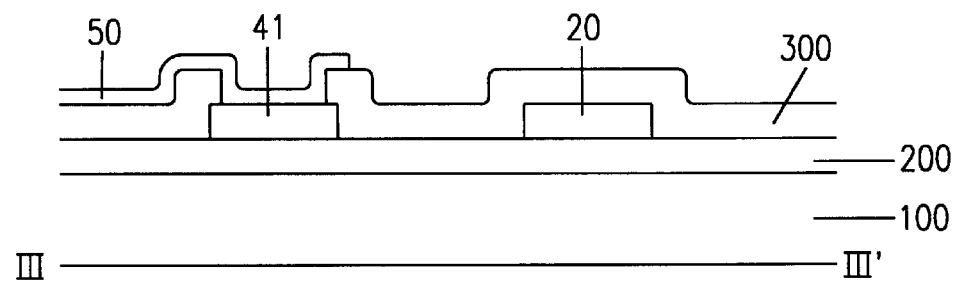

Finally, as shown in FIGS. 11a and 11c, the indium-tin-oxide is deposited and etched to form the indium-tin-oxide pixel electrodes 50 and 51 contacting the light-shading film 41 or the drain electrode 22 through the contact holes C1 and C2, C5 and C6 respectively.

In a method for manufacturing liquid crystal displays as shown in FIGS. 1 and 3, another embodiment along the line III–III' will be described below with reference to FIGS. 12a–12e.

Figure 12A:
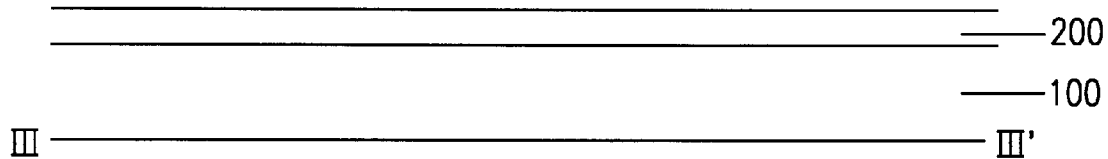
FIGS. 12a through 12c are cross-sectional views showing methods for manufacturing other liquid crystal displays according to the present invention.
Figure 12B:
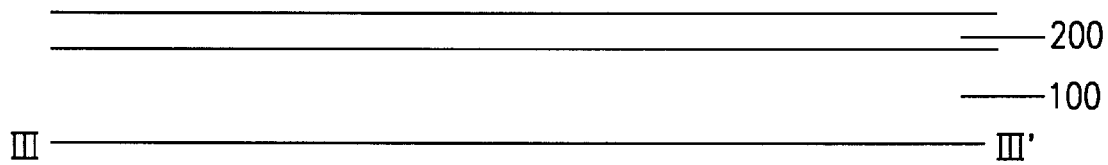

As shown in FIG. 12a, as the amorphous silicon layer and the doped amorphous silicon layer are formed and then patterned so that only a portion of the top of the gate line 10 remains. Thus, the amorphous silicon layer 30 and the doped amorphous silicon layer 31 are formed.

Figure 12C:
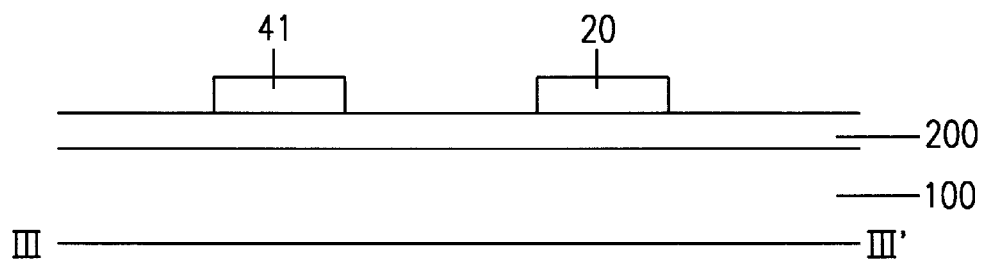

Next, as shown in FIG. 12c, the light-shading film 41 and the data pattern, including the source and drain electrodes 21 and 22 and the data line 20 are concurrently formed by evaporating a metal layer and then performing patterning. The data pattern is then used as a mask and to remove part of the doped amorphous silicon layer 31.

Figure 12D:
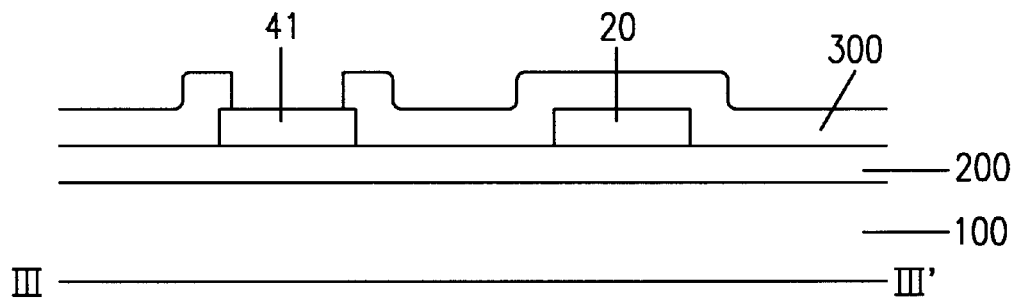

As shown in FIG. 12d, the guard film 300 is deposited and then removed on the top of the gate line 111 or the light-shading film 41. This forms the contact holes C5 and C6, C7 and C8 to expose parts of the drain electrode 22 and the light-shading film 41.

Figure 12E:
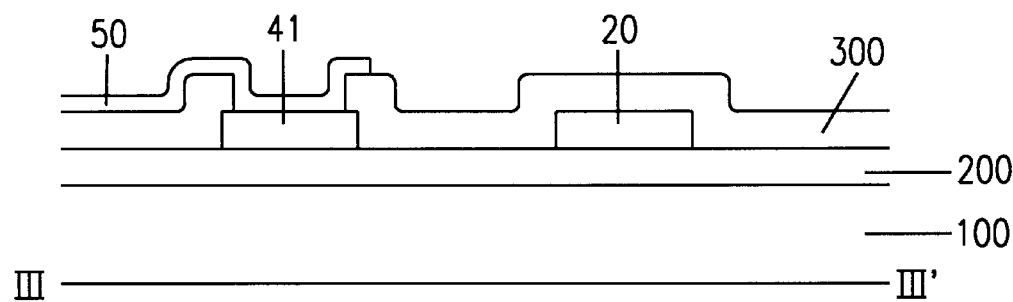

Finally, as shown in FIG. 12e, by depositing and patterning indium-tin-oxide, the pixel electrode 50 is formed. The pixel electrode contacts the drain electrode 22 and the light-shading film 41, through the contact holes C1 and C2, C5 and C6.

Accordingly, the contact holes allow the pixel electrode 50 to electrically contact the light-shading film 41. The pixel electrode 50 thus has the same potential as the light-shading film 41 when the liquid crystal display is driven.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A liquid crystal display comprising:

a liquid crystal display substrate:

an array of spaced apart gate lines on the substrate:

an array of spaced apart data lines on the substrate that intersect the array of spaced apart gate lines to define an array of pixels therebetween, an array of pixel electrodes, a respective one of which is in a respective one of the pixels, an array of switching elements, a respective one of which is connected between one of the gate lines, one of the data lines and one of the pixel electrodes an array of first conductive light shading lines, a respective one of which is in a respective one of the pixels spaced apart from the array of gate lines and from the array of data lines and electrically connected to the respective pixel electrode of the respective pixel; and first and second conductive layers, wherein the array of data lines comprise a first portion of the first conductive layer, wherein the array of gate lines comprise a first portion of the second conductive layer and wherein the array of first conductive light shading lines comprise a second portion of the first or second conductive layer.

2. A liquid crystal display according to claim 1 wherein the array of first conductive light shading lines extends parallel to the data lines.

3. A liquid crystal display according to claim 1 wherein the array of first conductive light shading lines extends parallel to the gate lines.

4. A liquid crystal display comprising:

a liquid crystal display substrate;

an array of spaced apart gate lines on the substrate;

an array of spaced apart data lines on the substrate that intersect the array of spaced apart gate lines to define an array of pixels therebetween;

an array of pixel electrodes, a respective one of which is in a respective one of the pixels, an array of switching elements, a respective one of which is connected between one of the gate lines, one of the data lines and one of the pixel electrodes, an array of first conductive light shading lines, a respective one of which is in a respective one of the pixels spaced apart from the array of gate lines and from the array of data lines, extending parallel to the data lines and electrically connected to the respective pixel electrode of the respective pixel; and an array of spaced apart auxiliary gate lines, that intersect and are electrically connected to the array of spaced apart gate lines, a respective auxiliary gate line and a respective first light shading line extending parallel to the data lines, on opposite sides of the respective pixel electrode.

5. A liquid crystal display according to claim 4 wherein a respective conductive light shading film overlaps a respective pixel electrode.

6. A liquid crystal display according to claim 5 further comprising an insulating layer between the array of pixel electrodes and the array of conductive light shading films, the liquid crystal display further comprising an array of contact holes in the insulating layer, a respective one of which extends between a respective pixel electrode and a respective conductive light shading film, the respective pixel electrode and the respective conductive light shading film electrically contacting one another through the respective contact hole.

7. A liquid crystal display according to claim 5 wherein the array of conductive light shading films is an array of opaque metal films and wherein a respective opaque metal film overlaps an end of a respective pixel electrode to thereby block light that emerges from the respective ends of the pixel electrodes.

8. A liquid crystal display comprising:

a liquid crystal display substrate;

an array of spaced apart gate lines on the substrate;

an array of spaced apart data lines on the substrate that intersect the array of spaced apart gate lines to define an array of pixels therebetween;

an array of pixel electrodes, a respective one of which is in a respective one of the pixels an array of switching elements, a respective one of which is connected between one of the grate lines, one of the data lines and one of the pixel electrodes, an array of first and second conductive light shading lines. a respective pair of which is in a respective one of the pixels spaced apart from the array of gate lines and from the array of data lines, on opposite sides of the respective pixel electrode and electrically connected to the respective pixel electrode of the respective pixel; and first and second conductive layers, wherein the array of data lines comprise a first portion of the first conductive layer, wherein the array of gate lines comprise a first portion of the second conductive layer and wherein the array of first and second conductive light shading lines comprise a second portion of the first or second conductive layer.

9. A liquid crystal display according to claim 8 wherein the array of first and second conductive light shading lines extends parallel to the data lines.

10. A liquid crystal display according to claim 8 wherein the array of first and second conductive light shading lines extends parallel to the gate lines.

11. A liquid crystal display comprising:

a liquid crystal display substrate;

an array of spaced apart gate lines on the substrate;

an array of spaced apart data lines on the substrate that intersect the array of spaced apart gate lines to define an array of pixels therebetween;

an array of pixel electrodes, a respective one of which is in a respective one of the pixels;

an array of switching elements, a respective one of which is connected between one of the gate lines, one of the data lines and one of the pixel electrodes; and an array of conductive light shading films, a respective one of which is in a respective one of the pixels spaced apart from the array of gate lines and from the array of data lines, and electrically connected to the respective pixel electrode of the respective pixel;

wherein the respective conductive light shading film overlaps the respective pixel electrode;

the liquid crystal display further comprising first and second insulating layers between the array of pixel electrodes and the array of conductive light shading films, the liquid crystal display further comprising first and second arrays of contact holes in the respective first and second insulating layers, a respective one of the first contact holes overlapping a respective one of the second contact holes to form an array of multiple layer contact holes, a respective one of which extends between a respective pixel electrode and a respective conductive light shading film, the respective pixel electrode and the respective conductive light shading film electrically contacting one another through the respective multiple layer contact hole.

12. A liquid crystal display comprising:

a liquid crystal display substrate;

a gate line on the substrate;

a first conductive light shading line on the substrate, spaced apart from the gate line;

a first insulating film on the gate line and on the first conductive light shading line, the first insulating film including a first contact hole that exposes the first conductive light shading line;

a first data line on the first insulating film;

a second insulating film on the first data line, the second insulating film including a second contact hole that expose the first contact hole; and a pixel electrode on the second insulating film, that receives signals from the first data line and that is electrically connected to the first conductive light shading line through the first and second contact holes.

13. A liquid crystal display according to claim 12 further comprising a thin film transistor including a gate electrode that is connected to the gate line, a source electrode that is connected to the data line and a drain electrode that is connected to the pixel electrode.

14. A liquid crystal display according to claim 12 wherein the first conductive light shading line extends parallel to the gate line.

15. A liquid crystal display according to claim 12 further comprising a second conductive light shading line on the substrate and a second data line on the first insulating film, wherein the first and second conductive light shading lines extend along opposing first and second sides of the pixel electrode, parallel to the first and second data lines, and wherein the second conductive light shading line is electrically connected to the pixel electrode.

16. A liquid crystal display according to claim 12 further comprising a first conductive layer, and wherein the data line and the first conductive light shading line comprise respective first and second portions of the first conductive layer.

17. A liquid crystal display according to claim 15 further comprising a first conductive layer, and wherein the data line and the first and second conductive light shading lines comprise respective first, second and third portions of the first conductive layer.

18. A liquid crystal display comprising:
   a liquid crystal display substrate;
   a gate line on the substrate;
   a first insulating film on the gate line;
   a first data line on the first insulating film, extending perpendicular to the gate line;
   a first conductive light shading line on the first insulating film, spaced apart from and extending parallel to the first data line;
   a second insulating film on the first data line and on the first conductive light shading film, the second insulating film including a first contact hole that exposes the first conductive light shading line; and
   a pixel electrode on the second insulating film opposite the first data line and the first conductive light shading film, that receives signals from the first data line and that is electrically connected to the first conductive light shading line through the first contact hole.

19. A liquid crystal display according to claim 18 further comprising a thin film transistor including a gate electrode that is connected to the gate line, a source electrode that is connected to the data line and a drain electrode that is connected to the pixel electrode.

20. A liquid crystal display according to claim 18 further comprising a first conductive layer, and wherein the first data line and the first conductive light shading line comprise respective first and second portions of the first conductive layer.

21. A liquid crystal display comprising:
   a liquid crystal display substrate:
   a gate line on the substrate;
   a first insulating film on the gate line;
   a first data line on the first insulating film, extending perpendicular to the gate line;
   a first conductive light shading line on the first insulating film, spaced apart from and extending parallel to the first data line;
   a second insulating film on the first data line, the second insulating film including a first contact hole that exposes the first conductive light shading line;
   a pixel electrode on the second insulating film that receives signals from the first data line and that is electrically connected to the first conductive light shading line through the first contact hole; and
   a second data line and a second conductive light shading line on the first insulating film, wherein the first and second conductive light shading lines extend along opposing first and second sides of the pixel electrode, parallel to the first and second data lines, wherein the second insulating film includes a second contact hole that exposes the second conductive light shading line and wherein the second conductive light shading line is electrically connected to the pixel electrode through the second contact hole.

22. A liquid crystal display according to claim 21 further comprising a first conductive layer, and wherein the first and second data lines and the first and second conductive light shading lines comprise respective first, second, third and fourth portions of the first conductive layer.

23. A method of manufacturing a liquid crystal display comprising the steps of:
   forming a first patterned conductive layer on a liquid crystal display substrate, the first patterned conductive layer defining a gate line and a first conductive light shading line that is spaced apart from the gate line;
   forming a first insulating film on the first patterned conductive layer, the first insulating film including a first contact hole that exposes the first conductive light shading line;
   forming a semiconductor layer on the first insulating film;
   forming a second patterned conductive layer on the first insulating film and on the semiconductor layer, the second patterned conductive layer defining a data line on the first insulating film, a source electrode on the semiconductor layer that is connected to the data line and a drain electrode on the semiconductor layer;
   forming a second insulating film on the second patterned conductive layer, the second insulating film including a second contact hole that exposes the first contact hole, and a third contact hole that exposes the drain electrode; and
   forming a pixel electrode on the second insulating film, that is electrically connected to the first conductive light shading line through the first and second contact holes and to the drain electrode through the third contact hole.

24. A method according to claim 23:
   wherein the step of forming a first patterned conductive layer comprises the step of forming a first patterned conductive layer on a liquid crystal display substrate, the first patterned conductive layer defining a gate line and first and second conductive light shading lines that are spaced apart from the gate line;
   wherein the step of forming a first insulating film comprises the step of forming a first insulating film on the first patterned conductive layer, the first insulating film including a first contact hole that exposes the first conductive light shading line and a fourth contact hole that exposes the second conductive light shading line;
   wherein the step of forming a second insulating film comprises the step of forming a second insulating film on the second patterned conductive layer, the second insulating film including a second contact hole that exposes the first contact hole, a third contact hole that exposes the drain electrode and a fifth contact hole that exposes the fourth contact hole; and wherein the step of forming a pixel electrode comprises the steps of forming a pixel electrode on the second insulating film, that is electrically connected to the first conductive light shading line through the first and second contact holes, to the drain electrode through the third contact hole and to the second conductive light shading line through the fourth and fifth contact holes.

25. A method of manufacturing a liquid crystal display comprising the steps of:

forming a first patterned conductive layer on a liquid crystal display substrate, the first patterned conductive layer defining a gate line;

forming a first insulating film on the first patterned conductive layer;

forming a semiconductor layer on the first insulating film;

forming a second patterned conductive layer on the first insulating film and on the semiconductor layer, the second patterned conductive layer defining a data line on the first insulating film, a first conductive light shading line on the first insulating film, a source electrode on the semiconductor layer that is connected to the data line and a drain electrode on the semiconductor layer;

forming a second insulating film on the second patterned conductive layer, the second insulating film including a first contact hole that exposes the first conductive light shading line and a second contact hole that exposes the drain electrode; and forming a pixel electrode on the second insulating film, that is electrically connected to the first conductive light shading line through the first contact hole and to the drain electrode through the second contact hole.

26. A method according to claim 25:

wherein the step of forming a second patterned conductive layer comprises the step of forming a second patterned conductive layer on the first insulating film and on the semiconductor layer, the second patterned conductive layer defining a data line on the first insulating film, first and second spaced apart conductive light shading lines on the first insulating film, a source electrode on the semiconductor layer that is connected to the data line and a drain electrode on the semiconductor layer;

wherein the step of forming a second insulating film comprises the step of forming a second insulating film on the second patterned conductive layer, the second insulating film including a first contact hole that exposes the first conductive light shading line, a second contact hole that exposes the drain electrode and a third contact hole that exposes the second conductive light shading line; and wherein the step of forming a pixel electrode comprises the steps of forming a pixel electrode on the second insulating film, that is electrically connected to the first conductive light shading line through the first contact hole, to the drain electrode through the second contact hole and to the second conductive light shading line through the third contact hole.

* * * * *